B. R. BENJAMIN & C. PEARSON.
CLUTCH MECHANISM.
APPLICATION FILED APR. 24, 1912.
1,219,225.
Patented Mar. 13, 1917.
2 SHEETS—SHEET 1.
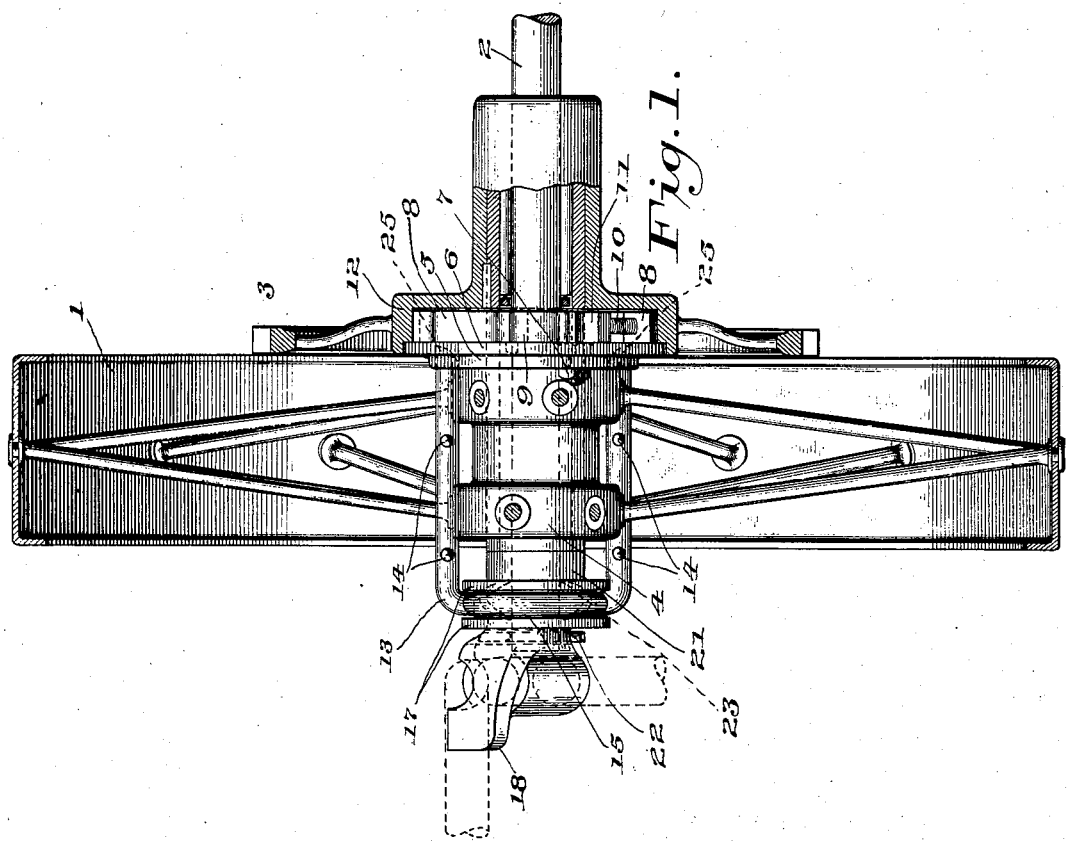
Witnesses:
C. C. Palmer.
F. W. Hoffmeister.
Inventors,
Bert R. Benjamin,
Charles Pearson,
By E. W. Burgess
Attorney.

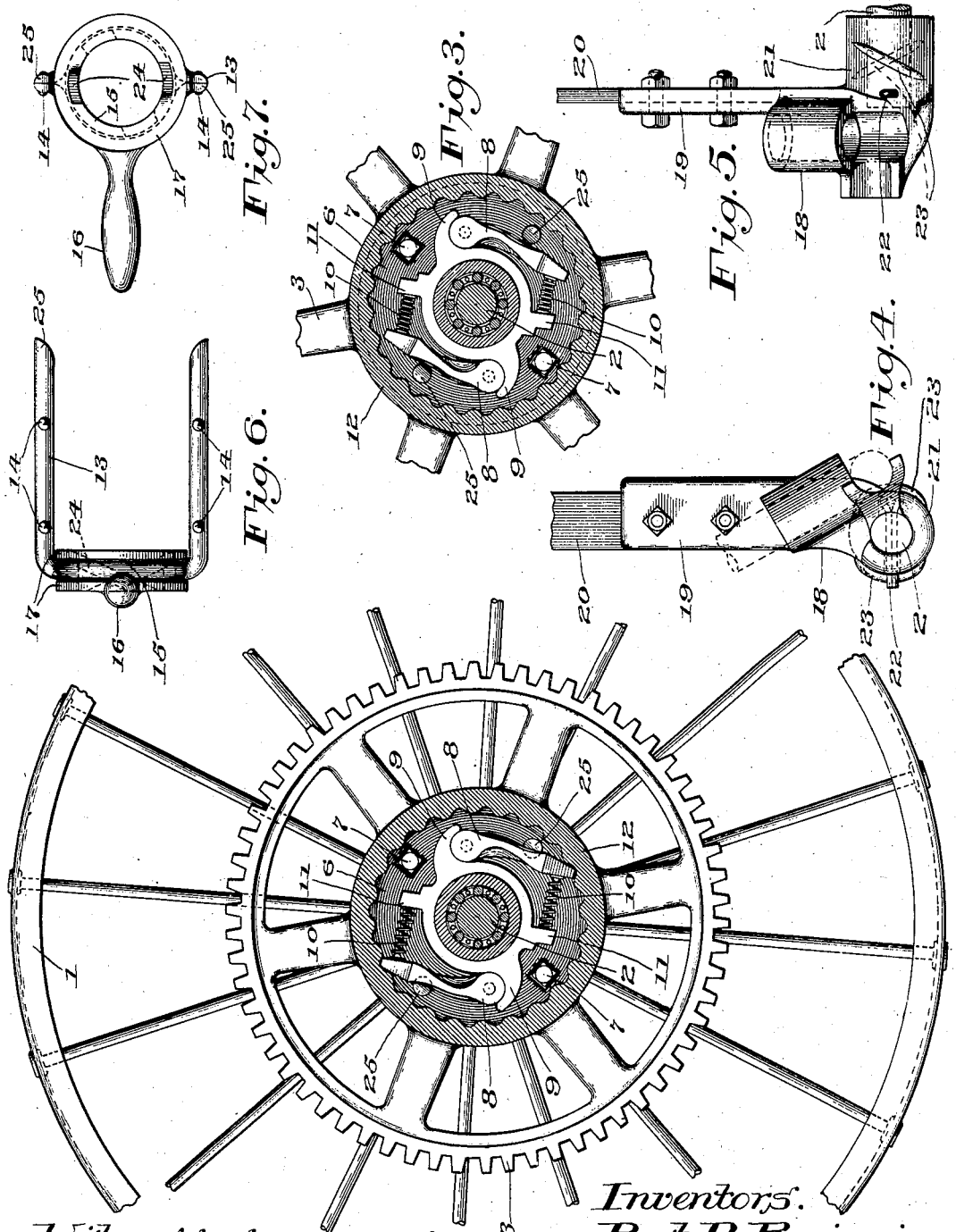

UNITED STATES PATENT OFFICE.

BERT R. BENJAMIN, OF OAK PARK, AND CHARLES PEARSON, OF CHICAGO, ILLINOIS, ASSIGNORS TO INTERNATIONAL HARVESTER COMPANY OF NEW JERSEY, A CORPORATION OF NEW JERSEY.

CLUTCH MECHANISM.

1,219,225.  Specification of Letters Patent.  Patented Mar. 13, 1917.

Application filed April 24, 1912. Serial No. 692,879.

*To all whom it may concern:*

Be it known that we, BERT R. BENJAMIN and CHARLES PEARSON, citizens of the United States, residing at Oak Park and Chicago, respectively, in the county of Cook and State of Illinois, have invented certain new and useful Improvements in Clutch Mechanism, of which the following is a specification.

Our invention relates to clutch mechanism of the positive type, such as the pawl and ratchet mechanism commonly used in connection with harvesting machinery, and consists in providing improved means for disengaging the pawl when it is desired to release the clutch mechanism, the object being to provide a simple and compact construction, positive in operation and not liable to become inoperative from wearing of the parts through continued use thereof. These objects are attained by means of mechanism, one embodiment of which is illustrated in the accompanying drawings, in which—

Figure 1 represents a vertical sectional elevation of a traction wheel designed for use in connection with a reaping machine, having a sprocket wheel connected therewith by means of our improved mechanism;

Fig. 2 represents a side elevation of Fig. 1 illustrating the operation of the pawl controlling mechanism;

Fig. 3 is a similar view representing the pawl in an inoperative position;

Fig. 4 is a detached detail of a brake member designed as a support for the clutch shipping lever;

Fig. 5 is a side elevation of Fig. 4;

Fig. 6 is a detached detail illustrating the form of the clutch shipping lever and the manner of connecting it with the pawl controlling mechanism; and Fig. 7 represents a side elevation of Fig. 6.

The same reference characters designate like parts throughout the several views.

1 designates a traction wheel designed for use in connection with a reaping machine, 2 an axle upon which said wheel is rotatably mounted, and 3 a sprocket wheel mounted upon said axle adjacent said wheel and adapted to rotate therewith. The hub 4 of the traction wheel is provided with a flange portion 5 at its inner end, to which is secured a pawl carrying plate 6 by means of bolts 7. 8 represents pawls pivotally mounted upon the plate and supported against endwise movement by means of a common form of curved wings 9 integral with the hub of the plate 6 and in which the heel portions of the pawls are seated, and 10 compression springs interposed between the opposite ends of the pawls and radially projecting ears 11 integral with the hub of the plate in a manner to normally swing the pawls about their pivotal connection in a direction to cause them to engage with the toothed rim portion 12 integral with the sprocket wheel 3 in a common way. 13 represents a pawl controlling member substantially U-shaped and formed from two separable members that are secured together by means of rivets 14, the head portions of the separate members having a semicircular form adapted to receive the hub portion 15 of a clutch shipping lever 16 when the two parts are assembled in operative relation, the hub of the clutch shipping lever being provided with flange portions 17 upon opposite sides of the head of the pawl controlling member that operate to connect said controlling member with said lever in a manner permitting the latter to rotate freely within the axial opening in the pawl controlling member and to compel the latter to follow a longitudinal movement of said lever relative to the axis thereof. 18 represents a bracket member having an arm 19 whereby it is secured to a part 20 that may form a fixed part of the frame of a harvesting machine, and a sleeve portion 21 that receives the axle member 2, the sleeve being secured to the axle member by means of a key 22. The clutch shipping lever 16 is provided with an axial opening that receives the sleeve 21 in a manner permitting said lever to turn freely thereon. 23 represents spirally arranged ribs upon the periphery of the sleeve, upon opposite sides thereof, the ribs being arranged in the form of threads and adapted to engage with threaded sections 24 formed upon the inner wall of the axial opening in the clutch shipping lever in a manner to cause said lever to move longitudinally upon said sleeve relative to the axis thereof and thereby project or retract the pawl controlling member toward or from the pawls.

The pawl controlling members receive the hub of the traction wheel between them, and their inner ends are slidably received by openings in the pawl carrying plate and provided with inclined wedge shaped portions 25 that are adapted to engage with the outside surface of the pawls in a manner to swing the latter against the force of the compression springs in a direction to release said pawls from engagement with the clutch teeth upon the sprocket wheel when the clutch shipping lever is turned about its axis in one direction, and to permit said pawls to reëngage with said sprocket wheel when said lever is turned in an opposite direction. In operation the pawls 8 are normally pressed, by means of the springs 10, in a direction to engage with the toothed rim 12, and will engage therewith when the pawl controlling member 13 is retracted by means of the lever 16 being turned in one direction and coacting with the spirally arranged ribs 23 upon the fixed sleeve 21, as shown in Figs. 1 and 5, when the lever 16 is turned in an opposite direction, the member 13 operates to disengage the pawls, as shown in Fig. 3.

While we have in this application specifically described one embodiment of our invention, it is to be understood that the form shown is used for purposes of illustration and may be modified without departing from the spirit of the invention, it being our intention to include all such modifications within the scope of the appended claims.

What we claim as our invention, and desire to secure by Letters Patent, is:

1. In combination, a shaft, a driven member thereon, a harvester main wheel carried on said shaft and disposed at one side of said driven member, ratchet and pawl clutch mechanism intermediate said main wheel and said driven member, and a pawl actuating member rotatable with said main wheel and reciprocable therethrough operable from the far side thereof from said driven member.

2. In a clutch mechanism, a shaft, a driving member thereon, a driven member thereon, clutch mechanism intermediate said driving and driven members, a sleeve encircling said shaft disposed on the opposite side of said driving member from said driven member; a clutch actuating member journaled on said sleeve, and means for converting a rotary movement of said sleeve into a reciprocatory movement of the same.

3. In a clutch mechanism, a shaft, a driving member carried thereon, a driven member mounted thereon, one of said members having a ratchet surface formed thereon and the other carrying a spring pressed pawl normally engaging said ratchet, a pawl controlling member engaging said pawl, a clutch operating member operatively connected to said pawl controlling member and rotatably mounted on said shaft, and operative connections operatively connected to said operating member for converting a rotary movement of the same into a reciprocatory movement of said pawl controlling member.

4. In a clutch mechanism, a shaft, a driving member carried thereon, a driven member journaled on said shaft, one of said members having a ratchet surface formed thereon and the other carrying a plurality of spring pressed pawls normally engaging said ratchet, a pawl controlling member slidable axially of said driving member holding said pawls out of engagement with said ratchet, a sleeve carried on said shaft, an operating member operatively connected to said pawl controlling member and rotatably mounted on said sleeve, and means intermediate said operating member and said sleeve converting a rotary movement of said operating member into a reciprocatory movement of said pawl controlling member.

5. In a clutch mechanism, a shaft, a driving member carried thereon, a driven member journaled on said shaft adjacent said driving member, the hub portion of said driven member being provided with a rim having pawl engaging teeth thereon, spring pressed pawls pivotally mounted upon the end of the hub of said driving member normally engaging the teeth on said rim, a movable pawl controlling member slidable axially of said driving member and operable from the opposite side of said driving member from said driven member actuating said pawls to effect disengagement thereof from said teeth when said controlling member is moved in one direction and releasing said pawls when said controlling member is moved in the opposite direction.

6. In a clutch mechanism, a shaft, a driving member carried thereon, a driven member carried thereon, a bracket encircling said shaft on the opposite side of said driving member from said driven member, clutch mechanism disposed between said driving and driven members, a sleeve rotatably mounted on said bracket, a clutch controlling member rotatably mounted on said sleeve and rotatable with said driving member, and means intermediate said sleeve and bracket whereby upon rotation of the latter said clutch controlling member is actuated.

7. In a clutch mechanism, a shaft, a driving member carried thereon, a driven member carried thereon, clutch mechanism intermediate said driving and driven members, a bearing bracket for said shaft disposed on the opposite side of said driving member from said driven member, a grooved sleeve carried on said bracket, a double arm clutch actuating member having a collar rotatable in the groove in said sleeve and its arms disposed parallel to the axis of said driving member, and means disposed between said sleeve and said bracket for converting a rotary movement of said sleeve into a reciprocatory movement catory movement of the same and said clutch actuating member.

8. In a clutch mechanism, a driving member, a coöperating driven member, one of said members having a serrated face and the other having a clutch pawl engageable with said serrated face, a shaft extending through said driving and driven members, a bracket receiving said shaft and disposed on the opposite side of said driving member from said driven member, a sleeve rotatable on said bracket, a clutch actuating member journaled on said sleeve having a pawl engaging member disposed parallel to the axis of said driving member, and means intermediate said bracket and sleeve whereby a rotary movement of said sleeve is converted into a reciprocatory movement of said clutch actuating member.

9. A clutch mechanism having, in combination, a fixed shaft, a driving member journaled upon said shaft, a driven member journaled upon said shaft adjacent said driving member, the hub portion of said driven member being provided with a rim portion having pawl engaging teeth thereon, spring-pressed pawls pivotally mounted upon one end of the hub of said driving member and adapted to engage with said teeth, a pawl controlling member slidably mounted upon the hub of said driving member and having one end thereof adapted to engage with said pawls in a manner to effect a disengagement thereof when said controlling member is moved in one direction, a bracket member secured to said fixed shaft, a clutch controlling lever rotatable about the axis of said shaft operatively connected to said pawl controlling member, and operative connections between said lever and said bracket converting rotary movements of said lever in opposite directions into a longitudinal movement of said pawl controlling member to engage or disengage the latter from the pawls.

10. A clutch mechanism having, in combination, a fixed shaft, a driving member journaled upon said shaft, a driven member journaled upon said shaft adjacent said driving member, the hub portion of said driven member being provided with a rim portion having pawl engaging teeth thereon, spring-pressed pawls pivotally mounted upon one end of the hub of said driving member and adapted to engage with said teeth, a U-shaped pawl controlling member slidably mounted upon the hub of said driving member, the leg portions of said controlling member being provided with wedge-shaped portions adapted to engage with said pawls, and the head portion thereof provided with an axial opening, a bracket member secured to said fixed shaft and provided with a sleeve portion, and a clutch controlling lever rotatably mounted upon said sleeve and movable longitudinally thereof, said lever having a hub portion received by the axial opening in the hub of said pawl controlling member.

BERT R. BENJAMIN.
CHARLES PEARSON.

Witnesses:
RAY PATTISON,
FRANK A. ZABILKA.